US012580225B2

(12) United States Patent
Takano

(10) Patent No.: US 12,580,225 B2
(45) Date of Patent: Mar. 17, 2026

(54) SOLID-STATE BATTERY

(71) Applicant: Murata Manufacturing Co., Ltd.,
Nagaokakyo (JP)

(72) Inventor: Ryohei Takano, Nagaokakyo (JP)

(73) Assignee: MURATA MANUFACTURING CO.,
LTD., Nagaokakyo (JP)

( * ) Notice: Subject to any disclaimer, the term of this
patent is extended or adjusted under 35
U.S.C. 154(b) by 526 days.

(21) Appl. No.: 18/332,352

(22) Filed: Jun. 9, 2023

(65) Prior Publication Data

US 2023/0318031 A1    Oct. 5, 2023

Related U.S. Application Data

(63) Continuation of application No.
PCT/JP2021/045188, filed on Dec. 8, 2021.

(30) Foreign Application Priority Data

Dec. 10, 2020    (JP) ................................. 2020-205168

(51) Int. Cl.
*H01M 10/0562*    (2010.01)
*H01M 4/02*    (2006.01)
*H01M 4/04*    (2006.01)
*H01M 4/48*    (2010.01)
*H01M 10/0525*    (2010.01)

(52) U.S. Cl.
CPC ..... *H01M 10/0562* (2013.01); *H01M 4/0407*
(2013.01); *H01M 4/48* (2013.01); *H01M*
*10/0525* (2013.01); *H01M 2004/027* (2013.01);
*H01M 2004/028* (2013.01); *H01M 2300/0071*
(2013.01)

(58) Field of Classification Search
CPC ..... H01M 10/0562; H01M 2300/0065; H01M
2300/0068; H01M 2300/0071; H01M
2300/0077
See application file for complete search history.

(56) References Cited

U.S. PATENT DOCUMENTS

2014/0287305 A1* 9/2014 Wachsman ........ H01M 10/0562
429/211

FOREIGN PATENT DOCUMENTS

JP        2017-111884 A    6/2017
JP        2018-206486 A    12/2018
(Continued)

OTHER PUBLICATIONS

Zhao et al., "Tuning a compatible interface with LLZTO integrated
on cathode material for improving NCM811/LLZTO solid-state
battery", Chemical Engineering Journal 405 (2021) 127031, avail-
able online Sep. 15, 2020 (Year: 2020).*
(Continued)

*Primary Examiner* — Ula C Ruddock
*Assistant Examiner* — Anna Korovina
(74) *Attorney, Agent, or Firm* — ArentFox Schiff LLP

(57)        ABSTRACT

A solid-state battery that includes a positive electrode layer,
a negative electrode layer, and a solid electrolyte layer
between the positive electrode layer and the negative elec-
trode layer, in which the positive electrode layer contains a
positive electrode active material and an oxide having a
garnet-type crystal structure, and a first Li concentration in
an interface vicinity with the positive electrode active mate-
rial in the oxide is lower than a second Li concentration in
a particle interior of the oxide.

20 Claims, 1 Drawing Sheet

(56) References Cited

FOREIGN PATENT DOCUMENTS

| JP | 2019-121462 A | 7/2019 | |
|----|----|----|----|
| WO | WO-2021235401 A1 * | 11/2021 | .............. H01B 1/08 |
| WO | WO-2022107826 A1 * | 5/2022 | ............. C04B 35/50 |
| WO | WO-2022178259 A1 * | 8/2022 | ......... C04B 35/6342 |

OTHER PUBLICATIONS

International Search Report and Written Opinion received in Int'l Appl. No. PCT/JP2021/045188, mailed on Feb. 1, 2022.
S. Ohta et al., "Grain Boundary Analysis of the Garnet-Like Oxides $Li_{7-x-y}La_{3-x}A_xZr_{2-y}Nb_yO_{12}$ (A = Sr or Ca)", Frontiers in Energy Research, v. 4, Article 30, Toyota Central R&D Labs., Inc., 2016.

* cited by examiner

SOLID-STATE BATTERY

CROSS REFERENCE TO RELATED APPLICATIONS

The present application is a continuation of International application No. PCT/JP2021/045188, filed Dec. 8, 2021, which claims priority to Japanese Patent Application No. 2020-205168, filed Dec. 10, 2020, the entire contents of each of which are incorporated herein by reference.

FIELD OF THE INVENTION

The present invention relates to a solid-state battery.

BACKGROUND OF THE INVENTION

In recent years, the demand for batteries has been greatly expanded as power supplies for portable electronic devices such as mobile phones and portable personal computers. As battery used for such an application, development of a sintered-type solid-state secondary battery (so-called "solid-state battery") in which a solid electrolyte is used as an electrolyte and other constituent elements are also composed of a solid has been advanced.

The solid-state battery includes a positive electrode layer, a negative electrode layer, and a solid electrolyte layer stacked between the positive electrode layer and the negative electrode layer. As the positive electrode layer, a positive electrode layer containing a positive electrode active material and a garnet-type oxide is known, and for example, Non-Patent Document 1 discloses that a garnet-type oxide in which Sr and Nb are concentrated in the vicinity of a grain boundary exists.

Non-Patent Document 1: S. Ohta et. al., Frontiers in Energy Research (2016) 4, 30 (Toyota Central R&D Labs., Inc.)

SUMMARY OF THE INVENTION

The inventor of the present invention has found that the following problems occur in a solid-state battery using the conventional positive electrode layer as described above. Specifically, there has been a problem that a side reaction occurs between the positive electrode active material and the garnet-type oxide during firing, and/or ionic conductivity of the garnet-type oxide decreases.

More specifically, when the garnet-type oxide had a chemical composition in which an amount of Li was relatively large, Li was excessively introduced (or diffused) into the positive electrode active material during firing, and the characteristics of the positive electrode active material were deteriorated. Thus, by using the garnet-type oxide in which the Li amount was relatively small, Li is less likely to be introduced (or diffused) into the positive electrode active material during firing, and the deterioration in characteristics of the positive electrode active material can be suppressed. However, a decrease in the Li amount in the garnet-type oxide caused a decrease in ionic conductivity, leading to an increase in resistance of the solid-state battery. Such a problem is particularly remarkable when a positive electrode active material having a layered rock salt type structure is used as the positive electrode active material. When the side reaction at the time of firing between the positive electrode active material and the garnet-type oxide could not be sufficiently suppressed, for example, an initial utilization rate of the positive electrode active material in the solid-state battery decreased. When the decrease in ionic conductivity of the garnet-type oxide could not be sufficiently suppressed, for example, a utilization rate of the positive electrode active material during 1C discharge in the solid-state battery was decreased.

An object of the present invention is to provide a solid-state battery capable of more sufficiently suppressing a decrease in ionic conductivity of a garnet-type oxide while more sufficiently suppressing a side reaction between a positive electrode active material and the garnet-type oxide during firing.

The present invention relates to a solid-state battery including a positive electrode layer, a negative electrode layer, and a solid electrolyte layer between the positive electrode layer and the negative electrode layer, in which the positive electrode layer contains a positive electrode active material and an oxide having a garnet-type crystal structure, and a first Li concentration in an interface vicinity with the positive electrode active material in the oxide is lower than a second Li concentration in a particle interior of the oxide.

The solid-state battery of the present invention can more sufficiently suppress a decrease in ionic conductivity of the garnet-type oxide while more sufficiently suppressing a side reaction between the positive electrode active material and the garnet-type oxide during firing.

DETAILED DESCRIPTION OF THE INVENTION

[Solid-State Battery]

Figure 1:
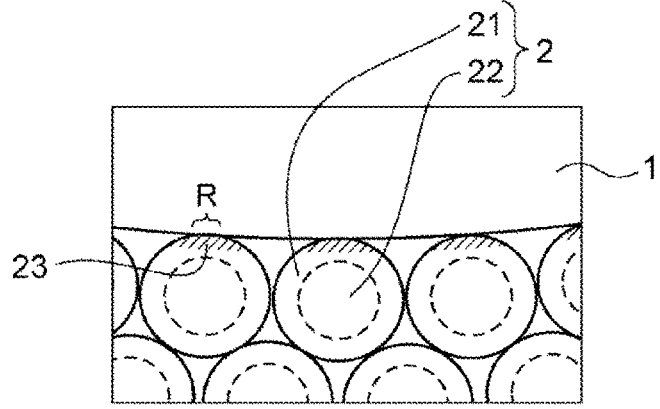
FIG. 1 shows a schematic sectional view showing one embodiment of a relationship between a positive electrode active material and a garnet-type oxide in a positive electrode layer of a solid-state battery according to the present invention.

The present invention provides a solid-state battery. The "solid-state battery" in the present specification refers to a battery whose constituent elements (especially electrolyte layers) are formed of solids in a broad sense and refers to an "all-solid-state battery" whose constituent elements (especially all constituent elements) are formed of solids in a narrow sense. The "solid-state battery" in the present specification encompasses a so-called "secondary battery" that can be repeatedly charged and discharged and a "primary battery" that can only be discharged. The "solid-state battery" is preferably the "secondary battery". The "secondary battery" is not excessively limited by its name but may include, for example, an electrochemical device such as a "electric storage device".

The solid-state battery of the present invention includes a positive electrode layer, a negative electrode layer, and a solid electrolyte layer, and usually has a stacked structure in which the solid electrolyte layer is disposed between the positive electrode layer and the negative electrode layer. Each of the positive electrode layer and the negative electrode layer may be stacked in two or more layers as long as a solid electrolyte layer is provided therebetween. The solid electrolyte layer in contact with the positive electrode layer and the negative electrode layer is sandwiched therebetween. The positive electrode layer and the solid electrolyte layer may have sintered bodies sintered integrally with each other, and/or the negative electrode layer and the solid electrolyte layer may have sintered bodies sintered integrally with each other. Having sintered bodies sintered integrally with each other means that two or more members (in particular, layers) adjacent to or in contact with each other are joined by sintering. Here, the two or more members (in particular, layers) may be integrally sintered while they are sintered bodies. The solid-state battery of the present invention may be referred to as a "sintered solid-state battery" or a "co-sintered solid-state battery" in the sense that the positive electrode layer and the solid electrolyte layer have sintered bodies sintered integrally with each other, and the negative electrode layer and the solid electrolyte layer have sintered bodies sintered integrally with each other.
(Positive Electrode Layer)

In the solid-state battery of the present invention, the positive electrode layer contains a positive electrode active material and an oxide (in the present specification, the oxide may be referred to as a garnet type oxide) having a garnet-type crystal structure. The positive electrode layer may have a form of a sintered body containing positive electrode active material particles and garnet-type oxide particles. The positive electrode layer is preferably a layer capable of occluding and releasing ions (in particular, lithium ions).

The positive electrode active material is not particularly limited, and a positive electrode active material known in the field of lithium ion batteries and solid-state batteries may be used. Examples of the positive electrode active material include lithium-transition metal composite oxide particles having a layered rock salt type structure (hereinafter may be referred to as a "layered rock salt type positive electrode active material"), lithium-containing phosphoric acid compound particles having a NASICON-type structure, lithium-containing phosphoric acid compound particles having an olivine-type structure, lithium-containing layered oxide particles, and lithium-containing oxide particles having a spinel-type structure. The positive electrode active material preferably contains the layered rock salt type positive electrode active material. When the positive electrode active material contains the layered rock salt type positive electrode active material, it is more difficult to sufficiently suppress both a side reaction at the time of firing the positive electrode active material and the garnet-type oxide and a decrease in ionic conductivity of the garnet-type oxide; however, this is because when such a layered rock salt type positive electrode active material is contained, both of the side reaction and the decrease in ionic conductivity can be more sufficiently suppressed.

The layered rock salt type positive electrode active material is a lithium transition metal composite oxide. The positive electrode active material having the layered rock salt type structure means that the lithium transition metal composite oxide (particularly, particles thereof) has a layered rock salt type crystal structure, and in a broad sense, it means that the positive electrode active material has a crystal structure that can be recognized as the layered rock salt type crystal structure by a person skilled in the art of batteries. In a narrow sense, the positive electrode active material having the layered rock salt type structure means that the lithium transition metal composite oxide (particularly, particles thereof) is identified to have the layered rock salt type crystal structure by analyzing an X-ray diffraction pattern by Rietveld analysis and the like. The lithium transition metal composite oxide is a generic term for oxides containing lithium and one or two or more kinds of transition metal elements as constituent elements.

The lithium transition metal composite oxide is, for example, a compound represented by $Li_xM1_yO_2$ and $Li_xM1_yM2_zO_2$. However, M1 is one or two or more kinds of transition metal elements, preferably contains cobalt, and more preferably contains cobalt alone from the viewpoint of further suppressing the side reaction during firing and the decrease in ionic conductivity of the garnet-type oxide. M2 is aluminum, magnesium, boron, zinc, tin, calcium, strontium, bismuth, sodium, potassium, silicon, phosphorus, or the like. The respective values of x, y, and z are optional.

Specifically, the lithium transition metal composite oxide is, for example, $LiCoO_2$ (that is, lithium cobalt oxide), $Li(Co_{0.8}Ni_{0.1}Mn_{0.1})O_2$, $LiNiO_2$, $LiVO_2$, $LiCrO_2$, $LiCo_{1/3}Ni_{1/3}Mn_{1/3}O_2$, or the like.

The layered rock salt type positive electrode active material is preferably lithium cobaltate from the viewpoint of further suppressing the side reaction during firing and the decrease in ionic conductivity of the garnet-type oxide.

When the positive electrode layer contains a layered rock salt type positive electrode active material, the content of the layered rock salt type positive electrode active material in the positive electrode layer is usually 20 vol % or more, particularly 20 vol % to 100 vol % with respect to the entire positive electrode layer, and is preferably 40 vol % to 80 vol %, more preferably 45 vol % to 70 vol % from the viewpoint of further suppressing the side reaction during firing and the decrease in ionic conductivity of the garnet-type oxide. The positive electrode layer may contain two or more kinds of layered rock salt type positive electrode active materials, and in that case, the total content thereof may be within the above range.

When the positive electrode layer contains a layered rock salt type positive electrode active material, the positive electrode layer may contain a positive electrode active material other than the layered rock salt type positive electrode active material. The content of the positive electrode active material other than the layered rock salt type positive electrode active material is usually 10 vol % or less with respect to the entire positive electrode layer, and is preferably 5 vol % or less, and more preferably 0 vol % from the viewpoint of further suppressing the side reaction during firing and the decrease in ionic conductivity of the garnet-type oxide.

The positive electrode active material having the NASICON-type structure means that the positive electrode active material (particularly, particles thereof) has a NASICON-type crystal structure, and means in a broad sense that the positive electrode active material has a crystal structure that can be recognized as a NASICON-type crystal structure by a person skilled in the art of solid-state batteries. In a narrow sense, the positive electrode active material having a NASICON-type structure in the positive electrode layer means that the positive electrode active material (in particular, particles thereof) exhibits, at a predetermined incident angle, one or more main peaks corresponding to a Miller index that is unique to a so-called NASICON-type crystal structure in X-ray diffraction. Examples of the positive electrode active material having a NASICON-type structure that is preferably used include $Li_3V_2(PO_4)_3$.

The positive electrode active material having an olivine-type structure means that the positive electrode active material (in particular, particles thereof) has an olivine-type crystal structure, and in a broad sense, it means that the positive electrode active material has a crystal structure that may be recognized as an olivine-type crystal structure by a person skilled in the art of solid-state batteries. In a narrow sense, the positive electrode active material having an olivine-type structure in the positive electrode layer means that the positive electrode active material (in particular, particles thereof) exhibits, at a predetermined incident angle, one or more main peaks corresponding to a Miller index that is unique to a so-called olivine-type crystal structure in X-ray diffraction. Examples of the preferably used positive electrode active materials that have an olivine-type structure include $Li_3Fe_2(PO_4)_3$ and $LiMnPO_4$.

The positive electrode active material having a spinel-type structure in the positive electrode layer means that the positive electrode active material (in particular, particles thereof) has a spinel-type crystal structure, and in a broad sense, it means that the positive electrode active material has a crystal structure that may be recognized as a spinel-type crystal structure by those skilled in the art of solid-state batteries. In a narrow sense, the positive electrode active material having a spinel-type structure in the positive electrode layer means that the positive electrode active material (in particular, particles thereof) exhibits one or more main peaks corresponding to Miller indices unique to a so-called spinel-type crystal structure at a predetermined incident angle in X-ray diffraction. Specific examples of the preferably used lithium-containing oxide having a spinel-type structure include $LiMn_2O_4$, $LiNi_{0.5}Mn_{1.5}O_4$, and $Li_4Ti_5O_{12}$.

The chemical composition of the positive electrode active material may be an average chemical composition. The average chemical composition of the positive electrode active material means an average value of the chemical compositions of the positive electrode active material in the thickness direction of the positive electrode layer. The average chemical composition of the positive electrode active material may be analyzed and measured by breaking the solid-state battery and performing composition analysis by EDX using SEM-EDX (energy dispersive X-ray spectroscopy) in a field of view in which the whole positive electrode layer fits in the thickness direction.

The positive electrode active material may be produced, for example, by the following method, or may be obtained as a commercially available product. In producing a positive electrode active material, first, a raw material compound containing a predetermined metal atom is weighed to have a predetermined chemical composition, and water is added and mixed to obtain a slurry. Next, the slurry is dried, calcined at 700° C. or higher and 1000° C. or lower for 1 hour or longer and 30 hours or shorter, and pulverized, whereby a positive electrode active material may be obtained.

The chemical composition and crystal structure of the positive electrode active material in the positive electrode layer may be usually changed by element diffusion during sintering. The positive electrode active material may have the chemical composition and crystal structure described above in the solid-state battery after being sintered together with the negative electrode layer and the solid electrolyte layer.

An average particle size of the positive electrode active material is not particularly limited, may be, for example, 100 nm to 10 μm, and is preferably 500 nm to 8 μm, and more preferably 1 μm to 6 μm, from the viewpoint of further suppressing the side reaction during firing and the decrease in ionic conductivity of the garnet-type oxide. The average particle size of the positive electrode active material is usually larger than the average particle size of the garnet-type oxide described later.

As the average particle size of the positive electrode active material, for example, 10 to 100 particles are randomly selected from the SEM image, and the particle sizes thereof may be simply averaged to determine the average particle size (arithmetic average).

The particle size is the diameter of a spherical particle when the particle is assumed to be a perfect sphere. For such a particle size, for example, a section of the solid-state battery is cut out, a sectional SEM image is photographed using an SEM, the sectional area S of the particle is calculated using image analysis software (for example, "Azo-kun" (manufactured by Asahi Kasei Engineering Corporation)), and then the particle diameter R may be determined by the following formula:

$$R=2\times(S/\pi)^{1/2}$$

The average particle size of the positive electrode active material in the positive electrode layer may be measured by specifying the positive electrode active material according to the composition at the time of measuring the chemical composition described above.

Usually, the average particle size of the positive electrode active material in the positive electrode layer may change due to sintering in the process of producing the solid-state battery. In the solid-state battery after being sintered together with the negative electrode layer and the solid electrolyte layer, the positive electrode active material may have the average particle size described above.

The garnet-type oxide is an oxide (particularly, metal oxide) having a garnet-type crystal structure. The oxide having a garnet-type crystal structure means, in an encompassing manner, that the oxide not only simply has a "garnet-type crystal structure", but also has a "garnet-type similar crystal structure". Specifically, the oxide has a crystal structure that can be identified as a garnet-type or a garnet-type similar crystal structure by those skilled in the field of solid-state batteries in X-ray diffraction. More specifically, the oxide may show, in X-ray diffraction, one or more main peaks corresponding to a Miller index unique to a so-called garnet-type crystal structure (diffraction pattern: ICDD Card No. 01-080-6142) at a predetermined incident angle, or as a pseudo-garnet-type crystal structure, one or more main peaks corresponding to a Miller index unique to a so-called garnet-type crystal structure may show one or more main peaks having different incident angles (that is, peak positions or diffraction angles) and intensity ratios (that is, peak intensities or diffraction intensity ratios) due to a difference in composition. Examples of a typical diffraction pattern of the pseudo-garnet-type crystal structure include ICDD Card No. 00-045-0109.

In the present invention, the garnet-type oxide has a predetermined Li concentration gradient between an interface vicinity with the positive electrode active material and the particle interior. Specifically, the Li concentration in the interface vicinity with the positive electrode active material in the garnet-type oxide is lower than the Li concentration in the particle interior of the garnet-type oxide. In the garnet-type oxide, by setting the Li concentration in the interface vicinity with the positive electrode active material to be lower than the Li concentration in the particle interior, it is possible to minimize the decrease in ionic conductivity of the garnet-type oxide while suppressing a side reaction (that is, introduction or diffusion of Li into the positive electrode active material) with the positive electrode active material.

As a result, it is possible to improve a utilization rate of the positive electrode active material in the solid-state battery, and at the same time, it is possible to produce a low-resistance solid-state battery which is more sufficiently excellent in ion conductivity of the garnet-type oxide.

In the positive electrode layer, the positive electrode active material and the garnet-type oxide (particularly, at least a part thereof) may be usually arranged in direct contact with each other, or may be arranged in indirect contact with each other with an interface phase interposed therebetween.

For example, as shown in FIG. 1, a positive electrode active material particle 1 may be disposed in contact with adjacent garnet-type oxide particles 2 with a smaller contact area while having voids. At this time, as shown in FIG. 1, the garnet-type oxide particles may also be arranged in contact with each other with a smaller contact area while having voids therebetween. FIG. 1 shows a schematic sectional view showing one embodiment of a relationship between the positive electrode active material and the garnet-type oxide in the positive electrode layer of the solid-state battery according to the present invention.

Figure 2:
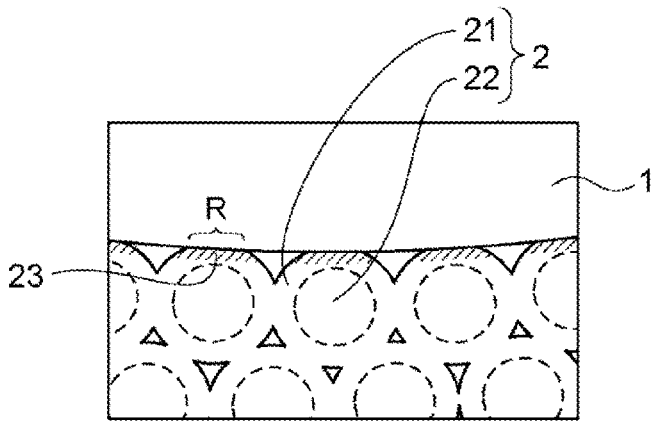
FIG. 2 shows a schematic sectional view showing another embodiment of the relationship between the positive electrode active material and the garnet-type oxide in the positive electrode layer of the solid-state battery according to the present invention.

For example, as shown in FIG. 2, as a heat treatment (for example, sintering) proceeds, the positive electrode active material particle 1 may be disposed in contact with the adjacent garnet-type oxide particles 2 with a larger contact area while having fewer voids. At this time, as shown in FIG. 2, the garnet-type oxide particles may also be arranged in contact with each other with a larger contact area while having fewer voids therebetween. FIG. 2 shows a schematic sectional view showing another embodiment of the relationship between the positive electrode active material and the garnet-type oxide in the positive electrode layer of the solid-state battery according to the present invention.

Figure 3:
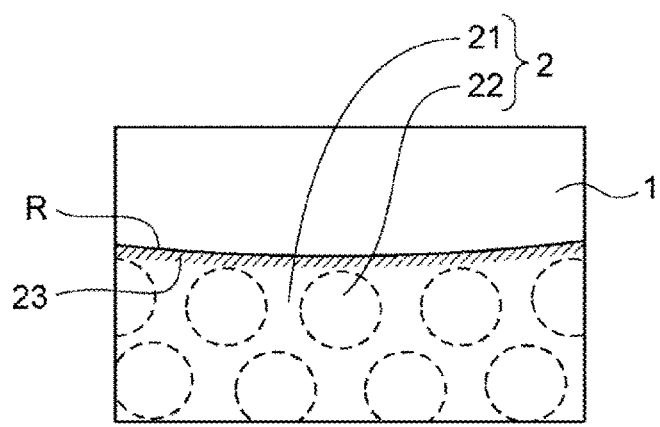
FIG. 3 shows a schematic sectional view showing still another embodiment of the relationship between the positive electrode active material and the garnet-type oxide in the positive electrode layer of the solid-state battery according to the present invention.

For example, as shown in FIG. 3, the heat treatment (for example, sintering) may further proceed, and the positive electrode active material particle 1 may be disposed in contact with the adjacent garnet-type oxide (or particles thereof) 2 with a larger contact area without having a void. At this time, as shown in FIG. 3, the garnet-type oxide particles may also be arranged in contact with each other with a larger contact area without having a void therebetween. FIG. 3 shows a schematic sectional view showing still another embodiment of the relationship between the positive electrode active material and the garnet-type oxide in the positive electrode layer of the solid-state battery according to the present invention.

For example, the positive electrode active material particle 1 may be disposed in contact with the adjacent garnet-type oxide (or particles thereof) 2 while having the forms shown in FIGS. 1 to 3 in a composite manner.

In a sectional view (particularly, sectional view by TEM or STEM photograph) of the solid-state battery of the present invention, the garnet-type oxide particles are usually distinguished into a peripheral edge region 21 and an internal region 22 thereof as shown in FIG. 1, and as the heat treatment (for example, sintering) proceeds, the peripheral edge region 21 may be connected and shared among the plurality of garnet-type oxide particles as shown in FIGS. 2 to 3. The peripheral edge region 21 and the internal region 22 can be usually distinguished from each other by a difference in contrast (that is, brightness or shade) caused by a difference in chemical composition in a sectional view by, for example, a scanning transmission electron microscope (STEM) dark-field (DF) image. In the present specification, the sectional view may be a sectional view when the solid-state battery (particularly, the positive electrode layer thereof) is cut in all directions, and for example, may be a sectional view when the positive electrode layer is cut in a direction perpendicular to a main surface thereof.

Specifically, the interface vicinity in the garnet-type oxide particles is a region in which a distance from an interface R with the positive electrode active material 1 in the garnet-type oxide 2 (that is, distance from the interface R toward the garnet-type oxide 2) is 50 nm or less in a sectional view, and corresponds to, for example, a shaded region represented by a reference sign "23" in FIGS. 1 to 3. The interface vicinity 23 is usually disposed in the peripheral edge region 21 of the garnet-type oxide. A particle interior 22 is an inner region surrounded by the peripheral edge region 21 in a sectional view. In the solid-state battery of the present invention, in the positive electrode layer, the Li concentration in the interface vicinity 23 with the positive electrode active material 1 as described above in the garnet-type oxide 2 is lower than the Li concentration in the particle interior 22 of the garnet-type oxide 2. When the positive electrode active material and the garnet-type oxide are in indirect contact with each other with the interface phase interposed therebetween, the interface R is an interface between the interface phase and the garnet-type oxide.

In the present invention, attention is paid to arbitrary five positive electrode active material particles 1 in each cut section (TEM sectional view) in arbitrary two directions of the positive electrode layer (ten positive electrode active material particles in total). Next, for each of the positive electrode active material particles 1, the Li concentration at arbitrary ten points in the interface vicinity 23 of the adjacent garnet-type oxide 2 is determined, and an average Li concentration in the interface vicinity 23 for a total of ten positive electrode active material particles is determined. In addition, for each of the positive electrode active material particles 1, the Li concentration at arbitrary ten points in the particle interior 22 of the adjacent garnet-type oxide 2 is determined, and the average Li concentration in the particle interior 22 for a total of ten positive electrode active material particles is determined. As a result, the average Li concentration in the interface vicinity 23 is lower than the average Li concentration in the particle interior 22.

In the present specification, the Li concentrations in the interface vicinity 23 and the particle interior 22 may be directly measured using TEM-EELS (electron energy loss spectroscopy). A molar ratio of elements other than Li may be analyzed using TEM-EDX (energy dispersive X-ray spectroscopy), and then the Li amount may be calculated from the following formula (I). The average Li concentration can be obtained by performing point analysis on a predetermined number of points in each site and obtaining an average value thereof.

Hereinafter, the Li concentration gradient of the garnet-type oxide of the positive electrode layer in the solid-state battery of the present invention will be described in detail by exemplifying a preferred embodiment in which the garnet-type oxide has a specific chemical composition.

The garnet-type oxide preferably has a chemical composition represented by the following general formula (I) from the viewpoint of further suppressing the side reaction during firing and the decrease in ionic conductivity of the garnet-type oxide. Specifically, the interface vicinity 23 and the particle interior 22 of the garnet-type oxide preferably each independently have a chemical composition represented by the following general formula (I) from the viewpoint of further suppressing the side reaction during firing and the decrease in ionic conductivity of the garnet-type oxide. More specifically, it is preferable that each garnet-type oxide particle includes the peripheral edge region and the internal region thereof as described above, and the interface vicinity with the positive electrode active material disposed in the peripheral edge region and the particle interior surrounded by the peripheral edge region preferably each independently have the chemical composition represented by the following general formula (I) from the viewpoint of further suppressing the side reaction during firing and the decrease in ionic conductivity of the garnet-type oxide.

$$(Li_{\alpha-p}A_x)(B^I_{\beta-y}B^{II}_y)(D^I_{\gamma-z}D^{II}_z)O_\omega \qquad (I)$$

In the formula (I), A is one or more elements that can be made into a solid solution in the Li site of the garnet-type oxide. Specifically, A is one or more elements selected from the group (hereinafter may be referred to as "group a") consisting of Mg (magnesium), Al (aluminum), Ga (gallium), Sc (scandium), and Fe (iron).

$B^I$ is one or more elements selected from the group consisting of elements capable of having tervalent valency among elements belonging to Groups 1 to 3 capable of having eight-coordination with oxygen. $B^I$ is specifically one or more elements selected from the group (hereinafter may be referred to as "group bI") consisting of La (lanthanum), Y (yttrium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), and Lu (lutetium). $B^I$ preferably contains La (lanthanum) from the viewpoint of further suppressing the side reaction during firing and the decrease in ionic conductivity of the garnet-type oxide. $B^I$ may contain La (lanthanum) alone.

$B^{II}$ is one or more elements selected from the group consisting of elements capable of having valences other than tervalent valency among elements belonging to Groups 1 to 3 capable of having eight-coordination with oxygen. $B^{II}$ is specifically one or more elements selected from the group (hereinafter may be referred to as "group bII") consisting of Ca (calcium), Sr (strontium), and Ba (barium) as bivalent $B^{II}$, and Ce (cerium) as tetravalent $B^{II}$.

$D^I$ is one or more elements selected from the group consisting of elements capable of having tetravalent valency among transition elements and typical elements belonging to Groups 12 to 15 capable of having six-coordination with oxygen. $D^I$ is specifically one or more elements selected from the group (hereinafter may be referred to as "group dI") consisting of Zr (zirconium), Ti (titanium), Hf (hafnium, Ge (germanium), and Sn (tin). $D^I$ preferably contains Zr (zirconium) from the viewpoint of further suppressing the side reaction during firing and the decrease in ionic conductivity of the garnet-type oxide. $D^I$ may contain Zr (zirconium) alone.

$D^{II}$ is one or more elements selected from the group consisting of elements capable of having valences other than tetravalent valency among transition elements and typical elements belonging to Groups 12 to 15 capable of having six-coordination with oxygen. $D^{II}$ is specifically one or more elements selected from the group (hereinafter may be referred to as "group dII") consisting of Sc (scandium) as trivalent $D^{II}$, Ta (tantalum), Nb (niobium), Sb (antimony), and Bi (bismuth) as pentavalent $D^{II}$, and Mo (molybdenum), W (tungsten), and Te (tellurium) as hexavalent $D^{II}$. $D^{II}$ is preferably one or more elements selected from the group consisting of Bi (bismuth) and Ta (tantalum), and more preferably contains Bi (bismuth), from the viewpoint of further suppressing the side reaction during firing and the decrease in ionic conductivity of the garnet-type oxide. When $D^{II}$ contains Bi, sinterability at the interface with the positive electrode active material is improved, so that the contact area with the positive electrode active material can be easily improved, and the utilization rate can be further improved.

A, $B^I$, $B^{II}$, $D^I$, and $D^{II}$ are as described above in both the interface vicinity 23 and the particle interior 22, and may be each independently within the above range. In each of the interface vicinity 23 and the particle interior 22, A, $B^I$, $B^{II}$, $D^I$, and $D^{II}$ are preferably as described in the following Embodiment 1 from the viewpoint of further suppressing the side reaction during firing and the decrease in ionic conductivity of the garnet-type oxide.

Embodiment 1

Interface Vicinity 23:

A is one or more elements selected from the group a;

$B^I$ is one or more elements selected from the group bI, preferably contains La (lanthanum), and particularly may contain only La (lanthanum) from the viewpoint of further suppressing the side reaction during firing and the decrease in ionic conductivity of the garnet-type oxide;

$B^{II}$ is one or more elements selected from the group bII;

$D^I$ is one or more elements selected from the group dI, preferably contains Zr (zirconium), and particularly may contain only Zr (zirconium) from the viewpoint of further suppressing the side reaction during firing and the decrease in ionic conductivity of the garnet-type oxide; and $D^{II}$ is one or more elements selected from the group dII, is preferably one or more elements selected from the group consisting of Bi (bismuth) and Ta (tantalum), and more preferably contains Bi (bismuth), and may particularly contain only Bi (bismuth), from the viewpoint of further suppressing the side reaction during firing and the decrease in ionic conductivity of the garnet-type oxide.

Particle Interior 21:

A is one or more elements selected from the group a, and may be particularly the same element as A in the interface vicinity in the present embodiment;

$B^I$ is one or more elements selected from the group bI, preferably contains La (lanthanum), and particularly may contain only La (lanthanum) from the viewpoint of further suppressing the side reaction during firing and the decrease in ionic conductivity of the garnet-type oxide; $B^I$ may be particularly the same element as $B^I$ in the interface vicinity in the present embodiment;

$B^{II}$ is one or more elements selected from the group bII, and may be particularly the same element as $B^{II}$ in the interface vicinity in the present embodiment;

$D^I$ is one or more elements selected from the group dI, preferably contains Zr (zirconium), and particularly may contain only Zr (zirconium) from the viewpoint of further suppressing the side reaction during firing and the decrease in ionic conductivity of the garnet-type oxide; $D^I$ may be particularly the same element as $D^I$ in the interface vicinity in the present embodiment; and $D^{II}$ is one or more elements selected from the group dII, preferably contains one or more elements selected from the group (hereinafter may be referred to as "group dII") consisting of Bi (bismuth) and Ta (tantalum), is more preferably one or more elements selected from the group dII', still more preferably contains Bi (bismuth), and may particularly contain only Bi (bismuth) and Ta (tantalum), from the viewpoint of further suppressing the side reaction during firing and the decrease in ionic conductivity of the garnet-type oxide.

In the formula (I), p is represented by the calculation formula (i):

$$p = ax - (3-b)y + (d-4)z \qquad (i)$$

In the formula (i), a represents an average valence of A. The average valence of A is, for example, a value represented by the formula: $(n1 \times r + n2 \times s + n3 \times t)/(n1+n2+n3)$ when A is recognized as n1 elements X with a valence r+, n2 elements Y with a valence s+, and n3 elements Z with a valence t+.

b is an average valence of $B^{II}$. The average valence of $B^{II}$ is, for example, a value represented by the same formula as the average valence of A described above when $B^{II}$ is recognized as n1 elements X with a valence r+, n2 elements Y with a valence s+, and n3 elements Z with a valence t+.

d is the average valence of $D^{II}$; and the average valence of $D^{II}$ is, for example, a value represented by the same formula as the average valence of A described above when $D^{II}$ is recognized as n1 elements X with a valence r+, n2 elements Y with a valence s+, and n3 elements Z with a valence t+.

In the present invention, when p is represented by the calculation formula (i) as described above, p (hereinafter referred to as "p1") in the interface vicinity 23 of the garnet-type oxide is larger than p (hereinafter referred to as "p2") in the particle interior 22. Specifically, both the interface vicinity 23 and the particle interior 22 of the garnet-type oxide are represented by the general formula (I), and when each of the interface vicinity 23 and the particle interior 22 is represented by the general formula (I), p1 in the interface vicinity is larger than p2 in the particle interior. Such a relationship between p1 in the interface vicinity 23 and p2 in the particle interior 22 has the same meaning as the above-described relationship regarding the concentration gradient of the Li concentration in the interface vicinity 23 and the Li concentration in the particle interior 22. In each of the interface vicinity and the particle interior, p is usually a value smaller than $\alpha$.

$\alpha$, $\beta$, $\gamma$, $\omega$, x, y, and z in the formula (I) will be separately described for the interface vicinity 23 and the particle interior 22.

The interface vicinity 23 usually satisfies the following condition K in the formula (I), and the particle interior 22 usually satisfies the following condition N in the formula (I).

(Interface Vicinity: Condition K)

$\alpha$ satisfies $5.0 \leq \alpha \leq 8.0$, and preferably satisfies $5.5 \leq \alpha \leq 7.5$, more preferably $5.5 \leq \alpha \leq 7.0$, still more preferably $6.0 \leq \alpha \leq 6.8$, particularly preferably $6.2 \leq \alpha \leq 6.8$, and most preferably $6.2 \leq \alpha \leq 6.6$, from the viewpoint of further suppressing the side reaction during firing and the decrease in ionic conductivity of the garnet-type oxide.

$\beta$ satisfies $2.5 \leq \beta \leq 3.5$, preferably satisfies $2.6 \leq \beta \leq 3.4$, more preferably $2.7 \leq \beta \leq 3.3$, still more preferably $2.8 \leq \beta \leq 3.2$, particularly preferably $2.9 \leq \beta \leq 3.1$, and most preferably 3.0, from the viewpoint of further suppressing the side reaction during firing and the decrease in ionic conductivity of the garnet-type oxide.

$\gamma$ satisfies $1.5 \leq \gamma \leq 2.5$, preferably satisfies $1.6 \leq \gamma \leq 2.4$, more preferably $1.7 \leq \gamma \leq 2.3$, still more preferably $1.8 \leq \gamma \leq 2.2$, particularly preferably $1.9 \leq \gamma \leq 2.1$, and most preferably 2.0, from the viewpoint of further suppressing the side reaction during firing and the decrease in ionic conductivity of the garnet-type oxide.

$\omega$ satisfies $11 \leq \omega \leq 13$, preferably $11 \leq \omega \leq 12.5$, more preferably $11.5 \leq \omega \leq 12.5$, and still more preferably "$12-\delta$", from the viewpoint of further suppressing the side reaction during firing and the decrease in ionic conductivity of the garnet-type oxide. $\delta$ represents an oxygen deficiency amount and may be 0. $\delta$ may usually satisfy $0 \leq \delta < 1$. The oxygen deficiency amount $\delta$ cannot be quantitatively analyzed with the latest device, and thus may be considered to be 0.

x satisfies $0 \leq x \leq 1.0$, preferably $0 \leq x \leq 0.8$, more preferably $0 \leq x \leq 0.6$, still more preferably $0 \leq x \leq 0.4$, particularly preferably $0 \leq x \leq 0.2$, and most preferably 0, from the viewpoint of further suppressing the side reaction during firing and the decrease in ionic conductivity of the garnet-type oxide.

y is a value smaller than $\beta$, usually satisfies $0 \leq y \leq 1.0$, preferably satisfies $0 \leq y \leq 0.8$, more preferably $0 \leq y \leq 0.6$, still more preferably $0 \leq y \leq 0.4$, particularly preferably satisfies $0 \leq y \leq 0.2$, and most preferably 0, from the viewpoint of further suppressing the side reaction during firing and the decrease in ionic conductivity of the garnet-type oxide.

z is a value of $\gamma$ or less, usually satisfies $0.4 \leq z \leq 2.2$, preferably satisfies $0.5 \leq y \leq 2.1$, more preferably $0.7 \leq z \leq 2.1$, still more preferably $0.9 \leq z \leq 2.1$, particularly preferably $1.5 \leq z \leq 2.1$, and most preferably $1.8 \leq z \leq 2.0$, from the viewpoint of further suppressing the side reaction during firing and the decrease in ionic conductivity of the garnet-type oxide. z (hereinafter may be referred to as $z_1$) in the interface vicinity is usually a value larger than z (hereinafter may be referred to as $z_2$) in the particle interior to be described later. $z_1$ and $z_2$ usually satisfy $0.1 \leq z_1 - z_2 \leq 2.0$, and from the viewpoint of further suppressing the side reaction during firing and the decrease in ionic conductivity of the garnet-type oxide, z1 and z2 satisfy $0.3 \leq z_1 - z_2 \leq 1.5$, and more preferably satisfy $1.0 \leq z_1 - z_2 \leq 1.5$.

(Particle Interior: Condition N)

$\alpha$ satisfies $5.0 \leq \alpha \leq 8.0$, and preferably satisfies $5.5 \leq \alpha \leq 7.5$, more preferably $5.5 \leq \alpha \leq 7.0$, still more preferably $6.0 \leq \alpha \leq 6.8$, particularly preferably $6.2 \leq \alpha \leq 6.8$, and most preferably $6.2 \leq \alpha \leq 6.6$, from the viewpoint of further suppressing the side reaction during firing and the decrease in ionic conductivity of the garnet-type oxide.

$\beta$ satisfies $2.5 \leq \beta \leq 3.5$, preferably satisfies $2.6 \leq \beta \leq 3.4$, more preferably $2.7 \leq \beta \leq 3.3$, still more preferably $2.8 \leq \beta \leq 3.2$, particularly preferably $2.9 \leq \beta \leq 3.1$, and most preferably 3.0, from the viewpoint of further suppressing the side reaction during firing and the decrease in ionic conductivity of the garnet-type oxide.

$\gamma$ satisfies $1.5 \leq \gamma \leq 2.5$, preferably satisfies $1.6 \leq \gamma \leq 2.4$, more preferably $1.7 \leq \gamma \leq 2.3$, still more preferably $1.8 \leq \gamma \leq 2.2$, particularly preferably $1.9 \leq \gamma \leq 2.1$, and most preferably 2.0, from the viewpoint of further suppressing the side reaction during firing and the decrease in ionic conductivity of the garnet-type oxide.

$\omega$ satisfies $11 \leq \omega \leq 13$, preferably $11 \leq \omega \leq 12.5$, more preferably $11.5 \leq \omega \leq 12.5$, and still more preferably "$12-\delta$", from the viewpoint of further suppressing the side reaction during firing and the decrease in ionic conductivity of the garnet-type oxide. $\delta$ represents an oxygen deficiency amount and may be 0. $\delta$ may usually satisfy $0 \leq \delta < 1$. The oxygen deficiency amount $\delta$ cannot be quantitatively analyzed with the latest device, and thus may be considered to be 0.

x satisfies $0 \leq x \leq 1.0$, preferably $0 \leq x \leq 0.8$, more preferably $0 \leq x \leq 0.6$, still more preferably $0 \leq x \leq 0.4$, particularly preferably $0 \leq x \leq 0.2$, and most preferably 0, from the viewpoint of further suppressing the side reaction during firing and the decrease in ionic conductivity of the garnet-type oxide.

y is a value smaller than $\beta$, usually satisfies $0 \leq y \leq 1.0$, preferably satisfies $0 \leq y \leq 0.8$, more preferably $0 \leq y \leq 0.6$, still more preferably $0 \leq y \leq 0.4$, particularly preferably satisfies $0 \leq y \leq 0.2$, and most preferably 0, from the viewpoint of further suppressing the side reaction during firing and the decrease in ionic conductivity of the garnet-type oxide.

z is a value of y or less, usually satisfies $0.1 \leq z \leq 1.0$, preferably satisfies $0.2 \leq y \leq 0.9$, more preferably $0.3 \leq z \leq 0.9$, still more preferably $0.4 \leq z \leq 0.8$, particularly preferably $0.5 \leq z \leq 0.7$, and most preferably $0.55 \leq z \leq 0.65$, from the viewpoint of further suppressing the side reaction during firing and the decrease in ionic conductivity of the garnet-type oxide.

In the present invention, as described above, both the interface vicinity 23 and the particle interior 22 of the garnet-type oxide are represented by the general formula (I) described above, and when each of the interface vicinity 23 and the particle interior 22 is represented by the general formula (I) and p is represented by the calculation formula (i), p (that is, p1) of the interface vicinity 23 is larger than p (that is, p2) of the particle interior 22.

As p1 of the interface vicinity 23 and p2 of the particle interior 22, values obtained by the following method can be used. Attention is paid to arbitrary five positive electrode active material particles 1 in each cut section (TEM sectional view) in arbitrary two directions of the positive electrode layer (ten positive electrode active material particles in total). Next, for each of the positive electrode active material particles 1, the chemical composition at arbitrary ten points in the interface vicinity 23 of the adjacent garnet-type oxide 2 is determined, and an average p1 value in the interface vicinity 23 for a total of ten positive electrode active material particles is determined. In addition, for each of the positive electrode active material particles 1, the chemical composition at arbitrary ten points in the particle interior 22 of the adjacent garnet-type oxide 2 is determined, and an average p2 value in the particle interior 22 for a total of ten positive electrode active material particles is determined. As a result, the average p1 value in the interface vicinity 23 may be larger than the average p2 value in the particle interior 22.

The chemical composition of the interface vicinity 23 and the particle interior 22 in the garnet-type oxide of the present invention may be measured by performing quantitative analysis (composition analysis) using TEM-EDX (energy dispersive X-ray spectroscopy). Although a method of measuring the chemical composition of the interface vicinity 23 and the particle interior 22 is not particularly limited, for example, TEM-EELS (Transmission Electron Microscope-Electron Energy-Loss Microscopy: Electron Energy-Loss Spectroscopy) measurement or the like may be performed.

p1 in the interface vicinity 23 and p2 in the particle interior 22 preferably satisfy the following relational expression of Embodiment e1, more preferably the following relational expression of Embodiment e2, still more preferably the following relational expression of Embodiment e3, particularly preferably the following relational expression of Embodiment e4, still more preferably the following relational expression of Embodiment e5, further more preferably the following relational expression of Embodiment e6, still further more preferably the following relational expression of Embodiment e7, and most preferably the following relational expression of Embodiment e8, from the viewpoint of further suppressing the side reaction during firing and the decrease in ionic conductivity of the garnet-type oxide:

Embodiment e1: $0.1 \leq p1 - p2$.
Embodiment e2: $0.1 \leq p1 - p2 \leq 2.0$.
Embodiment e3: $0.25 \leq p1 - p2 \leq 1.8$.
Embodiment e4: $0.25 \leq p1 - p2 \leq 1.5$.
Embodiment e5: $0.5 \leq p1 - p2 \leq 1.5$.
Embodiment e6: $0.65 \leq p1 - p2 \leq 1.5$.

Embodiment e7: $0.7 \leq p1 - p2 \leq 1.5$.
Embodiment e8: $1.0 \leq p1 - p2 \leq 1.5$.

p1 in the interface vicinity 23 preferably satisfies the following relational expression of Embodiment f1, more preferably the following relational expression of Embodiment f2, still more preferably the following relational expression of Embodiment f3, particularly preferably the following relational expression of Embodiment f4, still more preferably the following relational expression of Embodiment f5, further more preferably the following relational expression of Embodiment f6, and most preferably the following relational expression of Embodiment f7, from the viewpoint of further suppressing the side reaction during firing and the decrease in ionic conductivity of the garnet-type oxide:

Embodiment f1: $0.4 < p1 \leq 2.0$.
Embodiment f2: $0.5 \leq p1 \leq 2.0$.
Embodiment f3: $0.7 \leq p1 \leq 2.0$.
Embodiment f4: $1.2 \leq p1 \leq 2.0$.
Embodiment f5: $1.5 \leq p1 \leq 2.0$.
Embodiment f6: $1.7 \leq p1 \leq 2.0$.
Embodiment f7: $1.8 \leq p1 \leq 2.0$.

p2 in the particle interior 22 preferably satisfies the following relational expression of Embodiment g1, more preferably the following relational expression of Embodiment g2, still more preferably the following relational expression of Embodiment g3, particularly preferably the following relational expression of Embodiment g4, still more preferably the following relational expression of Embodiment g5, further more preferably the following relational expression of Embodiment g6, and most preferably the following relational expression of Embodiment g7, from the viewpoint of further suppressing the side reaction during firing and the decrease in ionic conductivity of the garnet-type oxide:

Embodiment g1: $0.1 \leq p2 \leq 1.5$.
Embodiment g2: $0.1 \leq p2 \leq 1.2$.
Embodiment g3: $0.1 \leq p2 \leq 1.0$.
Embodiment g4: $0.3 \leq p2 \leq 1.0$.
Embodiment g5: $0.3 \leq p2 \leq 0.7$.
Embodiment g6: $0.5 \leq p2 \leq 0.7$.
Embodiment g7: $0.55 \leq p2 \leq 0.7$.

The garnet-type oxide preferably has a chemical composition represented by the following general formula (II) from the viewpoint of further suppressing the side reaction during firing and the decrease in ionic conductivity of the garnet-type oxide. Specifically, the interface vicinity 23 and the particle interior 22 of the garnet-type oxide preferably each independently have a chemical composition represented by the following general formula (II) from the viewpoint of further suppressing the side reaction during firing and the decrease in ionic conductivity of the garnet-type oxide.

$$(Li_{7-p})(La_3)(Zr_{2-z}D''_z)O_\omega \qquad (II)$$

In the formula (II), $D''$ is the same as $D''$ in the general formula (I). For example, $D''$ is the same as $D''$ in the general formula (I) both in the interface vicinity and the particle interior.

z in the formula (II) is the same as z in the condition K in the formula (I) for the interface vicinity, and is the same as z in the condition N in the formula (I) for the particle interior.

$\omega$ in the formula (II) is the same as $\omega$ in the condition K in the formula (I) for the interface vicinity, and is the same as ω in the condition N in the formula (I) for the particle interior.

p in the formula (II) is represented by p=(d−4) z.

The general formula (II) is one embodiment included in the general formula (I). Thus, when the garnet-type oxide (particularly, the interface vicinity 23 and the particle interior 22 thereof) has the chemical composition represented by the general formula (II), p1 and p2 converted from the general formula (II) only need to satisfy the relational expression between p1 and p2 in the general formula (I).

The average particle size of the garnet-type oxide is not particularly limited, may be, for example, 10 nm to 5 μm, and is preferably 50 nm to 1 μm, and more preferably 100 nm to 800 nm, from the viewpoint of further suppressing the side reaction during firing and the decrease in ionic conductivity of the garnet-type oxide. The average particle size of the garnet-type oxide can be determined in the same manner as the average particle size of the positive electrode active material described above.

The content of the garnet-type oxide is usually 10 vol % or more, particularly 20 vol % to 80 vol % with respect to the entire positive electrode layer, and is preferably 30 vol % to 80 vol %, more preferably 30 vol % to 70 vol % from the viewpoint of further suppressing the side reaction during firing and the decrease in ionic conductivity of the garnet-type oxide. The positive electrode layer may contain two or more types of garnet-type oxides, and in that case, the total content thereof may be within the above range.

Since the garnet-type oxide has the Li concentration gradient (for example, p-value gradient in the general formulae (I) and (II)) in the interface vicinity 23 and the particle interior 22 as described above, it can also be referred to as "Li concentration gradient structure-type garnet oxide".

In the positive electrode layer, the Li concentration gradient (for example, p-value gradient in the general formulae (I) and (II)) of the garnet-type oxide in the interface vicinity 23 and the particle interior 22 can be formed by using a core-shell structured garnet-type oxide produced in advance in production of the positive electrode layer.

In the core-shell structured garnet-type oxide, a core portion is formed from a garnet-type oxide having a relatively high Li concentration, and a shell layer is formed from a garnet-type oxide having a relatively low Li concentration. Specifically, such a core-shell structured garnet-type oxide can be produced by forming the core portion from a garnet-type oxide having a relatively small p and forming a shell portion from a garnet-type oxide having a relatively large p. More specifically, the core-shell structured garnet-type oxide can be obtained by performing heat treatment (for example, at least firing) in a state where a garnet-type oxide layer having relatively large p as the shell layer is present around garnet-type oxide particles having relatively small p as core particles. Still more specifically, the core particles are mixed with a solution in which a material for forming a shell layer is dissolved, a solvent is evaporated, and then heat treatment is performed to obtain garnet-type oxide particles in which the shell layer is coated on the core particles. In addition, by heat-treating the garnet-type oxide particles coated with the shell layer, a core-shell structured garnet-type oxide can be obtained. The above production method is an example of obtaining the garnet-type oxide having the Li concentration gradient, and the garnet-type oxide may be produced by other production methods.

The core particle is a garnet-type oxide particle having relatively small p, and examples thereof include the same material as the garnet-type oxide having the chemical composition inside the particle represented by the general formula (I) or the general formula (II) described above.

The core particle can be available from the following method. A raw material compound containing a predetermined metal atom is weighed so as to provide a predetermined chemical composition, and water is added thereto and mixed therewith to obtain a slurry. Next, the slurry is dried, calcined at 700° C. or higher and 1000° C. or lower for 1 hour or longer and 30 hours or shorter, and pulverized, whereby a core particle may be obtained.

The average particle size of the core particles is not particularly limited as long as the average particle size of the garnet-type oxide is within the above range, may be, for example, 5 nm to 4 μm, and is preferably 40 nm to 0.8 μm, and more preferably 80 nm to 700 nm, from the viewpoint of further suppressing the side reaction during firing and the decrease in ionic conductivity of the garnet-type oxide. The average particle size of the core particles can be determined in the same manner as the average particle size of the positive electrode active material described above.

The material for forming a shell layer is a material for forming a garnet-type oxide layer having relatively large p as the shell layer, and is, for example, a material mixture for forming a layer formed from a garnet-type oxide having relatively large p. The mixing ratio in the material mixture may be such a ratio that the shell layer has a predetermined chemical composition after sintering. Examples of the garnet-type oxide having relatively large p as the shell layer include the same material as the garnet-type oxide having the chemical composition in the interface vicinity represented by the general formula (I) or the general formula (II) described above.

The average film thickness of the shell layer is not particularly limited as long as the average particle size of the garnet-type oxide is within the above range, may be, for example, 5 nm to 10 μm, and is preferably 10 nm to 2 μm, and more preferably 20 nm to 1 μm, from the viewpoint of further suppressing the side reaction during firing and the decrease in ionic conductivity of the garnet-type oxide.

In the present specification, the average film thickness of the shell layer may be calculated by performing TEM measurement of core particles having the shell layer, measuring the film thickness of the shell layer at any twenty points, and averaging the values.

The content of the material for forming a shell layer in the slurry is not particularly limited as long as the core-shell structured garnet-type oxide can be obtained, and may be, for example, 1 mol % to 70 mol %, particularly 10 mol % to 50 mol % with respect to 100 mol % of the core particles.

The solvent is not particularly limited as long as it can dissolve the material for forming a shell layer, and for example, a solvent that may be used for producing a positive electrode layer, a negative electrode layer, or a solid electrolyte layer in the field of solid-state batteries is used. As the solvent, a solvent capable of using the binder described below is usually used. Examples of such a solvent include alcohols such as 2-methoxyethanol.

The heat treatment conditions for forming the shell layer are not particularly limited as long as the core-shell structured garnet-type oxide is obtained. The heat treatment temperature may be, for example, 600° C. or higher and 1100° C. or lower, particularly may be 700° C. or higher and 950° C. or lower. The heat treatment time may be, for example, 10 minutes or longer and 1440 minutes or shorter, particularly may be 60 minutes or longer and 600 minutes or shorter.

The positive electrode layer may contain a metal oxide (for example, so-called solid electrolyte) (hereinafter referred to as other metal oxides) other than the garnet-type oxide, and in this case, the content of other metal oxides is usually 10 vol % or less with respect to the entire positive electrode layer, and is preferably 5 vol % or less, more preferably 0 vol % from the viewpoint of further suppressing the side reaction during firing and the decrease in ionic conductivity of the garnet-type oxide.

The positive electrode layer may further contain a sintering aid and/or a conduction aid.

As the sintering aid, various sintering aids known in the field of solid-state batteries can be used. The composition of such a sintering aid contains at least lithium (Li), boron (B), and oxygen (O), and the molar ratio of Li to B (Li/B) is preferably 2.0 or more. Specific examples of such a sintering aid include $Li_4B_2O_5$, $Li_3BO_3$, $(Li_{2.7}Al_{0.3})BO_3$, $Li_{2.8}(B_{0.8}C_{0.2})O_3$, and $LiBO_2$.

The content of the sintering aid is not particularly limited, and is, for example, preferably 0.1 vol % to 20 vol %, more preferably 1 vol % to 10 vol % with respect to the entire positive electrode layer.

For the conduction aid, conduction aids known in the field of solid-state batteries can be used. Examples of preferably used conduction aids include metal materials such as Ag (silver), Au (gold), Pd (palladium), Pt (platinum), Cu (copper), Sn (tin), and Ni (nickel); and carbon materials such as acetylene black, Ketjen black, and carbon nanotubes such as Super P (registered trademark) and VGCF (registered trademark). The shape of the carbon material is not particularly limited, and any shape such as a spherical shape, a plate shape, and a fibrous shape may be used.

The content of the conduction aid is not particularly limited, and is, for example, preferably 50 vol % or less (particularly 0 vol % to 50 vol %), and more preferably 40 vol % or less (particularly 0 vol % to 40 vol %) with respect to the entire positive electrode layer.

The thickness of the positive electrode layer is usually 0.1 to 30 µm, and for example, preferably 1 to 20 µm. As the thickness of the positive electrode layer, an average value of thicknesses measured at any 10 points in an SEM image is used.

In the positive electrode layer, a porosity is not particularly limited, and is preferably 20 vol % or less, more preferably 15 vol % or less, and still more preferably 10 vol % or less.

As the porosity of the positive electrode layer, a value measured from an SEM image after FIB section processing is used.

The positive electrode layer is a layer that may be referred to as a "positive electrode active material layer". The positive electrode layer may have a so-called positive electrode current collector or a positive electrode current collecting layer.

(Negative Electrode Layer)

In the solid-state battery of the present invention, the negative electrode layer is not particularly limited. The negative electrode layer usually contains a negative electrode active material. The negative electrode layer is preferably a layer capable of occluding and releasing ions (in particular, lithium ions).

The negative electrode active material is not particularly limited, and a negative electrode active material known in the field of solid-state batteries may be used. Examples of the negative electrode active material include carbon materials such as graphite, graphite-lithium compounds, lithium metal, lithium alloy particles, phosphate compounds having a NASICON-type structure, Li-containing oxides having a spinel-type structure, and oxides having a $\beta_{II}$-$Li_3VO_4$-type structure and a $\gamma_{II}$-$Li_3VO_4$-type structure. As the negative electrode active material, it is preferable to use lithium metal or a Li-containing oxide having a $\beta_{II}$-$Li_3VO_4$-type structure or a γII-$Li_3VO_4$-type structure.

The oxide having a $\beta_{II}$-$Li_3VO_4$-type structure in the negative electrode layer means that the oxide (in particular, particles thereof) has a $\beta_{II}$-$Li_3VO_4$-type crystal structure, and in a broad sense, it means that the oxide has a crystal structure that may be recognized as a $\beta_{II}$-$Li_3VO_4$-type crystal structure by a person skilled in the art of solid-state batteries. In a narrow sense, the oxide having a βII-$Li_3VO_4$-type structure in the negative electrode layer means that the oxide (in particular, particles thereof) exhibits one or more main peaks corresponding to Miller indices unique to a so-called βII-$Li_3VO_4$-type crystal structure at a predetermined incident angle in X-ray diffraction. Examples of the Li-containing oxide having a $\beta_{II}$-$Li_3VO_4$-type structure preferably used include $Li_3VO_4$.

The oxide having a γII-$Li_3VO_4$-type structure in the negative electrode layer means that the oxide (in particular, particles thereof) has a γII-$Li_3VO_4$-type crystal structure, and in a broad sense, it means that the oxide has a crystal structure that may be recognized as a γII-$Li_3VO_4$-type crystal structure by a person skilled in the art of solid-state batteries. In a narrow sense, the oxide having a γII-$Li_3VO_4$-type structure in the negative electrode layer means that the oxide (in particular, particles thereof) exhibits one or more main peaks corresponding to Miller indices unique to a so-called γII-$Li_3VO_4$-type crystal structure at a predetermined incident angle (x-axis) in X-ray diffraction. Examples of the Li-containing oxide having a γII-$Li_3VO_4$-type structure preferably used include $Li_{3.2}V_{0.8}Si_{0.2}O_4$.

The chemical composition of the negative electrode active material may be an average chemical composition. The average chemical composition of the negative electrode active material means an average value of the chemical compositions of the negative electrode active material in the thickness direction of the negative electrode layer. The average chemical composition of the negative electrode active material may be analyzed and measured by breaking the solid-state battery and performing composition analysis by EDX using SEM-EDX (energy dispersive X-ray spectroscopy) in a field of view in which the whole negative electrode layer fits in the thickness direction.

The negative electrode active material may be produced, for example, by the same method as the positive electrode active material or may be obtained as a commercially available product.

Usually, the chemical composition and crystal structure of the negative electrode active material in the negative electrode layer may be changed by element diffusion during sintering in the production process of the solid-state battery. The negative electrode active material may have the average chemical composition and crystal structure described above in the solid-state battery after being sintered together with the positive electrode layer and the solid electrolyte layer.

The content of the negative electrode active material in the negative electrode layer is not particularly limited, and is, for example, preferably 50% or more (particularly 50% to 99%), more preferably 70% to 95%, still more preferably 80% to 90% with respect to the entire negative electrode layer.

The negative electrode layer may further contain a so-called solid electrolyte, a sintering aid and/or a conduction aid.

The solid electrolyte which may be contained in the negative electrode layer is not particularly limited, and examples thereof include a solid electrolyte exemplified as a solid electrolyte constituting a solid electrolyte layer described later.

When the negative electrode layer contains a solid electrolyte, the content of the solid electrolyte may be usually 20 vol % to 60 vol %, and particularly 30 vol % to 45 vol % with respect to the entire solid electrolyte layer.

As the sintering aid in the negative electrode layer, the same compound as the sintering aid in the positive electrode layer may be used.

As the conductive additive in the negative electrode layer, the same compound as the conductive additive in the positive electrode layer can be used.

The thickness of the negative electrode layer is usually 0.1 to 30 μm and preferably 1 to 20 μm. As the thickness of the negative electrode layer, an average value of thicknesses measured at any ten points in an SEM image is used.

In the negative electrode layer, the porosity is not particularly limited, but is preferably 20% or less, more preferably 15% or less, and still more preferably 10% or less.

As the porosity of the negative electrode layer, a value measured by the same method as the porosity of the positive electrode layer is used.

The negative electrode layer is a layer that may be referred to as a "negative electrode active material layer". The negative electrode layer may have a so-called negative electrode current collector or a negative electrode current collecting layer.

(Solid Electrolyte Layer)

In the solid-state battery of the present invention, the solid electrolyte layer contains a solid electrolyte.

The solid electrolyte contained in the solid electrolyte layer is not particularly limited, and may be any solid electrolyte contained in the solid electrolyte layer in the field of solid-state batteries. Such a solid electrolyte may be, for example, an oxide-based solid electrolyte, and examples thereof include one or more materials selected from garnet-type oxides (particularly, core-shell structured garnet-type oxides) contained in the positive electrode layer, solid electrolytes having $Li_2ZrO_3$ and $\gamma$-$Li_3VO_4$ structures, and oxide glass ceramic-based lithium ion conductors. From the viewpoint of further suppressing the side reaction during firing at a boundary between the positive electrode layer and the solid electrolyte layer and the decrease in ionic conductivity of the garnet-type oxide, the solid electrolyte layer preferably contains a garnet-type oxide (particularly, core-shell structured garnet-type oxide) contained in the positive electrode layer.

Examples of the solid electrolyte having a $\gamma$-$Li_3VO_4$ structure include a solid electrolyte having an average chemical composition represented by the following general formula (III).

$$(Li_{[3-ax+(5-c)(1-y)]}A_x)(B_yD_{1-y})O_4 \quad (III)$$

In the formula (III), A is one or more elements selected from the group consisting of Na, K, Mg, Ca, Al, Ga, Zn, Fe, Cr, and Co.

B is one or more elements selected from the group consisting of V and P.

D is one or more elements selected from the group consisting of Zn, Al, Ga, Si, Ge, Sn, As, Ti, Mo, W, Fe, Cr, and Co.

x satisfies $0 \leq x \leq 1.0$, particularly satisfies $0 \leq x \leq 0.2$.

y satisfies $0 \leq y \leq 1.0$, particularly satisfies $0.20 \leq y \leq 0.50$.

a is an average valence of A. The average valence of A is, for example, a value represented by $(n1 \times a + n2 \times b + n3 \times c)/(n1+n2+n3)$ when A is recognized as n1 of elements X having a valence a+, n2 of elements Y having a valence b+, and n3 of elements Z having a valence c+.

c is an average valence of D. The average valence of D is, for example, the same value as the average valence of A described above when D is recognized as n1 of elements X having a valence a+, n2 of elements Y having a valence b+, and n3 of elements Z having a valence c+.

Specific examples of the solid electrolyte having a $\gamma$-$Li_3VO_4$ structure include $Li_{3.2}(V_{0.8}Si_{0.2})O_4$, $Li_{3.5}(V_{0.5}Ge_{0.5})O_4$, $Li_{3.4}(P_{0.6}Si_{0.4})O_4$, and $Li_{3.5}(P_{0.5}Ge_{0.5})O_4$.

As the oxide glass ceramic-based lithium ion conductor, for example, a phosphate compound (LATP) containing lithium, aluminum, and titanium as constituent elements, and a phosphate compound (LAGP) containing lithium, aluminum, and germanium as constituent elements can be used.

The content of the solid electrolyte in the solid electrolyte layer is not particularly limited, and is, for example, preferably 10 vol % to 100 vol %, more preferably 20 vol % to 100 vol %, and still more preferably 30 vol % to 100 vol % with respect to the entire solid electrolyte layer.

The solid electrolyte layer may further contain, for example, a sintering aid and the like in addition to the solid electrolyte.

As the sintering aid in the solid electrolyte layer, the same compound as the sintering aid in the positive electrode layer may be used.

The content of the sintering aid in the solid electrolyte layer is not particularly limited, and is preferably 0 vol % to 20 vol %, and more preferably 1 vol % to 10 vol %, from the viewpoint of further suppressing the side reaction during firing and the decrease in ionic conductivity of the garnet-type oxide.

The thickness of the solid electrolyte layer is usually 0.1 to 30 μm, and is preferably 1 to 20 μm from the viewpoint of further suppressing the side reaction during firing and the decrease in ionic conductivity of the garnet-type oxide. As the thickness of the solid electrolyte layer, an average value of thicknesses measured at any ten points in an SEM image is used.

In the solid electrolyte layer, the porosity is not particularly limited, and is preferably 20 vol % or less, more preferably 15 vol % or less, and still more preferably 10 vol % or less, from the viewpoint of further suppressing the side reaction during firing and the decrease in ionic conductivity of the garnet-type oxide.

As the porosity of the solid electrolyte layer, a value measured by the same method as the porosity of the positive electrode layer is used.

[Method of Manufacturing Solid-State Battery]

The solid-state battery can be manufactured, for example, by a so-called green sheet method, a printing method, or a combined method thereof.

The green sheet method will be described.

First, a paste is prepared by appropriately mixing a positive electrode active material with a core-shell structured garnet-type oxide, a solvent, a binder, and the like. The paste is applied onto a sheet and dried to form a first green sheet for forming a positive electrode layer. The first green sheet may contain another so-called solid electrolyte, a conduction aid, a sintering aid, and/or the like.

A solvent, a binder, and the like are appropriately mixed with a negative electrode active material to prepare a paste. The paste is applied onto a sheet, and dried to form a second green sheet for constituting the negative electrode layer. The second green sheet may contain a so-called solid electrolyte, a conduction aid, a sintering aid, and/or the like.

A solvent, a binder, and the like are appropriately mixed with a solid electrolyte to prepare a paste. The paste is applied onto a sheet and dried to form a third green sheet for forming a solid electrolyte layer. The third green sheet may contain a sintering aid and the like.

The solvent for producing the first to third green sheets is not particularly limited, and for example, a solvent that may be used for producing a positive electrode layer, a negative electrode layer, or a solid electrolyte layer in the field of solid-state batteries is used. As the solvent, a solvent capable of using the binder described later is usually used. Examples of such a solvent include alcohols such as 2-propanol.

The binder for producing the first to third green sheets is not particularly limited, and for example, a binder that may be used for producing a positive electrode layer, a negative electrode layer, or a solid electrolyte layer in the field of solid-state batteries is used. Examples of such a binder include a butyral resin and an acrylic resin.

Next, the first to third green sheets are appropriately stacked to produce a laminate. The produced laminate may be pressed. Examples of a preferable pressing method include an isostatic pressing method.

Thereafter, the laminate is sintered at, for example, 600 to 800° C. to obtain a solid-state battery.

The printing method will be described.

The printing method is the same as the green sheet method except for the following matters.

An ink of each layer is prepared, the ink having the same composition as the composition of the paste of each layer for obtaining a green sheet except that the blending amounts of the solvent and the resin are adjusted to those suitable for use as the ink.

The ink of each layer is printed and stacked to produce a laminate.

Hereinafter, the present invention will be described in more detail based on specific examples, but the present invention is not limited to the following examples at all and may be appropriately changed and implemented without changing the gist thereof.

EXAMPLES

Examples 1 to 7

[Production of Core-Shell Structured Garnet-Type Oxide]
(Production of Core Particles)

As core particles, a garnet-type oxide powder was produced as follows.

Lithium hydroxide monohydrate $LiOH \cdot H_2O$, lanthanum hydroxide $La(OH)_3$, zirconium oxide $ZrO_2$, tantalum oxide $Ta_2O_5$, and bismuth oxide $Bi_2O_3$ were used for raw materials.

The respective raw materials were weighed so as to have the chemical composition shown in Table 1, encapsulated with the addition of water in a 100 ml polyethylene pot made of polyethylene, and rotated at 150 rpm for 16 hours on a pot rack to mix the raw materials. Lithium hydroxide monohydrate $LiOH \cdot H_2O$ as a Li source was charged in an excess of 3 wt % with respect to the target composition in consideration of Li deficiency during sintering.

The obtained slurry was evaporated and dried, and then calcined at 900° C. for 5 hours to obtain a target phase.

The calcined powder obtained was, with the addition of a mixed solvent of toluene-acetone thereto, subjected to grinding for 6 hours in a planetary ball mill.

The ground powder was dried to obtain a garnet-type oxide powder. It was confirmed that the garnet-type oxide single substance was obtained through XRD measurement of the powder. The powder was confirmed to have no compositional deviation through ICP measurement. The average particle size of the core particles at this time was 150 nm.

In Examples, the primary particle size of the material was not changed, and the structure and composition were controlled by the molar ratio of the raw materials and the firing time.

(Production of Powder in which Core Particles are Coated with Shell Layer)

A powder in which core particles were coated with a garnet-type oxide as a shell layer was produced as follows.

As raw materials, lithium nitrate $LiNO_3$, lanthanum nitrate hexahydrate $La(NO_3)_3 \cdot 6H_2O$, bismuth nitrate pentahydrate $Bi(NO_3)_3 \cdot 5H_2O$, zirconium(IV) isopropoxide $Zr(OC_3H_7)_4$, tantalum(V) ethoxide $Ta(OC_2H_5)_5$, and ethyl acetoacetate were used.

The respective raw materials were weighed so as to have the chemical composition shown in Table 1. Ethyl acetoacetate was weighed to be four times the molar amount of each alkoxide.

First, each alkoxide and ethyl acetoacetate were placed in a glass container and stirred for 30 minutes using a stirrer piece (solution A). Next, each nitrate and 2-methoxyethanol was placed in a glass container to dissolve the nitrate (solution B). The solution A was added dropwise little by little to the solution B to produce a uniform solution C. The predetermined core particles were mixed into the solution C and then mixed using a stirrer piece for 5 hours, and then the solvent was evaporated at 100° C. The obtained dry powder was subjected to a heat treatment at 700° C. for 5 hours to obtain a core-shell structured garnet-type oxide powder having a shell layer on core particles.

In addition, only the solution C was dried and then subjected to a heat treatment at 700° C. for 5 hours to obtain a shell layer powder. It was confirmed that the garnet-type oxide single substance was obtained through XRD measurement of the shell layer powder. Further, it was confirmed that the powder had no compositional deviation in the shell layer through ICP measurement. The thickness of the shell layer was 20 to 50 μm.

In Examples, the primary particle size of the material was not changed, and the structure and composition were controlled by the molar ratio of the raw materials and the firing time.

[Production of Positive Electrode Active Material]

The positive electrode active material was produced as follows.

As raw materials, lithium hydroxide monohydrate $Li_2CO_3$, cobalt oxide $Co_3O_4$, manganese oxide $MnO_2$, and nickel oxide $NiO$ were weighed so as to have a chemical composition of $Li(Co_{0.8}Ni_{0.1}Mn_{0.1})O_2$, encapsulated with the addition of water in a 100 ml polyethylene pot made of polyethylene, and rotated at 150 rpm for 16 hours on a pot rack to mix the raw materials. Thereafter, calcination was performed at 800° C. for 5 hours to obtain a target phase. The average particle size of the positive electrode active material particles after calcination was 5 μm. From the XRD measurement of the powder, it was confirmed that a single phase having a layered rock salt type structure (ICDD card No. 01-070-2685) was obtained. The powder was confirmed to have no compositional deviation through ICP measurement.

[Production of Sintering Aid]

Lithium hydroxide monohydrate LiOH·H₂O and boron oxide $B_2O_3$ were used. The respective starting materials were appropriately weighed such that the chemical composition of the sintering aid was $Li_4B_2O_5$, well mixed in a mortar, and then subjected to calcination at 650° C. for 5 hours.

[Production of Positive Electrode Half-Cell]

First, the core-shell structured garnet-type oxide, the positive electrode active material powder, and the sintering aid powder were weighed so as to have a volume ratio of 49:50:1, respectively, and kneaded with alcohol and a binder to prepare a positive electrode layer slurry, and the slurry was applied onto a sheet and dried to form the first green sheet for constituting the positive electrode layer.

The second green sheet for forming a solid electrolyte layer was formed by kneading with a core-shell structured garnet-type oxide similar to the core-shell structured garnet-type oxide contained in the first green sheet, an alcohol, and a binder to prepare a solid electrolyte layer slurry, and drying the solid electrolyte layer slurry.

The first and second green sheets were appropriately stacked to prepare a laminated body. The prepared laminated body was pressed by an isostatic pressing method and appropriately cut to obtain a laminated body of a positive electrode layer/solid electrolyte layer. The binder was removed at 400° C., and then the sheet was subjected to press sintering at 800° C. for 60 minutes under a pressure of 100 MPa to produce a co-fired body of a positive electrode layer/solid electrolyte layer. The thickness of the positive electrode layer after sintering was 15 μm, and the thickness of the solid electrolyte layer was about 200 μm.

Thereafter, metal Li as a counter electrode and a reference electrode was attached to a surface of the solid electrolyte layer on a side opposite to the positive electrode layer, and sealing with a 2032 type coin cell was carried out to obtain a solid-state battery.

[Evaluation 1: Initial Utilization Rate Calculation Method]

The prepared positive electrode half-cell was charged at a current density corresponding to 25° C. and 0.05 C until reaching an upper limit voltage of 4.2 V (vs. Li/Li+) by a constant current charge and discharge test. Thereafter, discharge was performed at a current density corresponding to 25° C. and 0.05 C until reaching a lower limit voltage of 3.0 V (vs. Li/Li+). An initial discharge capacity was calculated by dividing an electric quantity during initial discharge, obtained from the constant current charge and discharge test, by the weight of the positive electrode active material. The initial utilization rate was calculated by dividing the initial discharge capacity by a theoretical capacity (150 mAh/g) at an operating potential of the active material used, and the initial utilization rate was determined according to the following criteria.

⊙⊙: 85% initial utilization rate (best);

⊙: 70% initial utilization rate <85% (excellent);

○: 65% initial utilization rate <70% (good);

Δ: 60% initial utilization rate <65% (acceptable) (no problem in practical use); and x: initial utilization rate <60% (failure) (problem in practical use).

[Evaluation 2: Method of Calculating Utilization Rate During 1C Discharge]

The prepared positive electrode half-cell was charged at a current density corresponding to 25° C. and 0.05 C until reaching an upper limit voltage of 4.2 V (vs. Li/Li+) by a constant current charge and discharge test. Thereafter, discharge was performed at a current density corresponding to 25° C. and 1C until reaching a lower limit voltage of 1.5 V (vs. Li/Li+). The discharge capacity during 1C discharge was calculated by dividing an electric quantity during 1C discharge, obtained from the constant current charge and discharge test, by the weight of the positive electrode active material. The utilization rate during 1C discharge was calculated by dividing (150 mAh/g) the initial discharge capacity by the theoretical capacity at the operating potential of the active material used, and the utilization rate during 1C discharge was determined according to the following criteria.

⊙⊙: 70% utilization rate during 1C discharge (best);

⊙: 60% utilization rate during 1C discharge <70% (excellent);

○: 56% utilization rate during 1C discharge <60% (good);

Δ: 50% utilization rate during 1C discharge <56% (acceptable) (no problem in practical use); and x: utilization rate during 1C discharge <50% (failure) (problem in practical use).

[Comprehensive Determination]

Comprehensive determination was made based on all determination results (determination results of Evaluations 1 and 2).

⊙⊙: All the determination results were ⊙⊙.

⊙: The lowest determination result among all the determination results was ⊙.

○: The lowest determination result among all the determination results was ○.

Δ: The lowest determination result among all the determination results was Δ.

x: The lowest determination result among all the determination results was x.

Comparative Examples 1 to 3

A positive electrode half-cell was produced and evaluated by the same method as in Example 1 except that a non-core-shell structured garnet-type oxide produced by the following method was used instead of the core-shell structured garnet-type oxide. The chemical composition of the solid electrolyte layer used for the solid electrolyte layer of the positive electrode half-cell was $Li_{6.5}La_3(Zr_{1.5}Ta_{0.4}Bi_{0.1})O_{12}$.

[Production of Non-Core-Shell Structured Garnet-Type Oxide]

A non-core-shell structured garnet-type oxide was produced by the same method as the method of producing core particles of Example 1 except that the respective raw materials were weighed so as to have the chemical composition shown in Table 1.

The average particle size of the non-core-shell structured garnet-type oxide was 150 nm.

In each Comparative Example, the primary particle size of the material was not changed, and the structure and composition were controlled by the molar ratio of the raw materials and the firing time.

<Garnet-Type Crystal Structure>

The garnet-type crystal structure was confirmed by obtaining an X-ray diffraction image attributable to a garnet-type similar crystal structure by X-ray diffraction (XRD) measurement) (ICDD Card No. 00-045-0109).

<Layered Rock Salt Type Crystal Structure>

The layered rock salt type crystal structure was confirmed by obtaining an X-ray diffraction image attributable to the layered rock salt type crystal structure by X-ray diffraction (XRD measurement) (ICDD Card No. 01-070-2685).

<Chemical Composition of Core Particle and Shell Layer>

The chemical composition was measured by composition analysis by EDX using TEM-EDX (energy dispersive X-ray spectroscopy).

<Measurement of p1 in Interface Vicinity and p2 in Particle Interior>

The positive electrode layer of the positive electrode half-cell was cut out in arbitrary two directions by FIB processing, and attention was paid to arbitrary five positive electrode active material particles in each section (TEM sectional view) thereof (ten positive electrode active material particles in total). Next, for each of the positive electrode active material particles 1, a molar ratio of elements other than Li was obtained by TEM-EDX point analysis at arbitrary ten points in the interface vicinity 23 of the adjacent garnet-type oxide 2. From the obtained molar ratio of the constituent elements, the average p1 value of the interface vicinity 23 was obtained using the formula (I). In addition, for each of the positive electrode active material particles 1, the chemical composition at arbitrary ten points in the particle interior 22 of the adjacent garnet-type oxide 2 was determined by TEM-EDX point analysis, and the average p2 value in the particle interior 22 was determined. In the chemical composition described in Table 2, an element ratio obtained by EDX was set to $B^I + B^{II} = 3$ ($\beta = 3$) and $\alpha = 7$, and an absolute value of each constituent element was calculated. Since oxygen cannot be quantified, it was calculated as a calculated value in consideration of overall charge guarantee.

TABLE 1

| | | Core-shell structured garnet-type oxide chemical composition |
|---|---|---|
| Example 1 | Shell layer | Li5.8La3(Zr0.8Bi1.2)O12 |
| | Core portion | Li6.7La3(Zr1.7Bi0.3)O12 |
| Example 2 | Shell layer | Li6.2La3(Zr1.2Ta0.4Bi0.4)O12 |
| | Core portion | Li6.4La3(Zr1.6Ta0.4)O12 |
| Example 3 | Shell layer | Li5.0La3Bi2.0O12 |
| | Core portion | Li6.4La3(Zr1.6Ta0.4Bi0.2)O12 |
| Example 4 | Shell layer | Li6.4La3(Zr1.4Ta0.5Bi0.2)O12 |
| | Core portion | Li6.6La3(Zr1.6Bi0.4)O12 |
| Example 5 | Shell layer | Li5.0La3Bi2.0O12 |
| | Core portion | Li6.2La3(Zr1.2Ta0.4Bi0.4)O12 |
| Example 6 | Shell layer | Li6.1La3(Zr1.1Bi0.9)O12 |
| | Core portion | Li6.9La3(Zr1.9Bi0.1)O12 |
| Example 7 | Shell layer | Li5.9La3(Zr0.9Ta1.1)O12 |
| | Core portion | Li6.6La3(Zr1.6Ta0.4)O12 |
| Comparative Example 1 | — | Li6.6La3(Zr1.6Bi0.4)O12 |
| Comparative Example 2 | — | Li6.0La3(Zr1.0Bi1.0)O12 |
| Comparative Example 3 | — | Li5.0La3Bi2O12 |

TABLE 2

| | | Positive electrode layer chemical composition | Interface vicinity (p1) | Particle interior (p2) |
|---|---|---|---|---|
| Example 1 | Interface vicinity | Li6.0La3(Zr1.0Bi1.0)O12 | 1.0 | 0.4 |
| | Particle interior | Li6.6La3(Zr1.6Bi0.4)O12 | | |
| Example 2 | Interface vicinity | Li6.2La3(Zr1.2Ta0.4Bi0.4)O12 | 0.8 | 0.5 |
| | Particle interior | Li6.5La3(Zr1.6Ta0.4Bi0.05)O12.1 | | |
| Example 3 | Interface vicinity | Li5.1La3(Zr0.1Bi1.9)O12 | 1.9 | 0.6 |
| | Particle interior | Li6.4La3(Zr1.6Ta0.4Bi0.2)O12 | | |
| Example 4 | Interface vicinity | Li6.4La3(Zr1.5Ta0.4Bi0.2)O12.2 | 0.6 | 0.4 |
| | Particle interior | Li6.6La3(Zr1.6Ta0.1Bi0.4)O12.2 | | |
| Example 5 | Interface vicinity | Li5.1La3(Zr0.1Bi1.9)O12 | 1.9 | 0.8 |
| | Particle interior | Li6.2La3(Zr1.1Ta0.4Bi0.4)O18.8 | | |
| Example 6 | Interface vicinity | Li6.4La3(Zr1.3Bi0.6)O11.8 | 0.6 | 0.2 |
| | Particle interior | Li6.8La3(Zr1.9Bi0.2)O12.2 | | |
| Example 7 | Interface vicinity | Li6.0La3(Zr1.0Ta1.0)O12 | 1.0 | 0.4 |
| | Particle interior | Li6.6La3(Zr1.6Ta0.4)O12 | | |

| | Initial utilization rate | Determination | Utilization rate during 1 C discharge | Determination | Comprehensive determination |
|---|---|---|---|---|---|
| Example 1 | 76% | ⊙ | 65% | ⊙ | ⊙ |
| Example 2 | 70% | ⊙ | 61% | ⊙ | ⊙ |
| Example 3 | 88% | ⊙⊙ | 75% | ⊙⊙ | ⊙⊙ |
| Example 4 | 65% | ○ | 60% | ⊙ | ○ |
| Example 5 | 88% | ⊙⊙ | 58% | ○ | ○ |
| Example 6 | 63% | Δ | 50% | Δ | Δ |
| Example 7 | 65% | ○ | 55% | Δ | Δ |

TABLE 3

| | | Positive electrode layer chemical composition | Interface vicinity (p1) | Particle interior (p2) |
|---|---|---|---|---|
| Comparative Example 1 | Interface vicinity Particle interior | Li6.6La3(Zr1.6Bi0.4)O12 | 0.4 | 0.4 |
| Comparative Example 2 | Interface vicinity Particle interior | Li6.0La3(Zr1.0Bi1.0)O12 | 1.0 | 1.0 |
| Comparative Example 3 | Interface vicinity Particle interior | Li5.0La3Bi2O12 | 2.0 | 2.0 |

| | Initial utilization rate | Determination | Utilization rate during 1 C discharge | Determination | Comprehensive determination |
|---|---|---|---|---|---|
| Comparative Example 1 | 30% | X | 3% | X | X |
| Comparative Example 2 | 75% | ⊙ | 14% | X | X |
| Comparative Example 3 | 81% | ⊙ | 21% | X | X |

Comparison between Comparative Example 1 and Examples 1 to 7 showed that by increasing p1 in the interface vicinity (decreasing the Li amount) while maintaining p2 in the particle interior at a relatively low value, the utilization rate during 1C discharge could be improved while maintaining a high initial utilization rate. This is considered to be because the side reaction with the positive electrode active material is suppressed by increasing p1 in the interface vicinity, and the ionic conductivity of the solid electrolyte is increased by maintaining p2 in the particle interior at a relatively low value.

Comparison between Example 1 and Example 7 showed that when $D^{II}$ contained Bi, the initial utilization rate and the utilization rate during 1C discharge were further improved. This is considered to be because an increase in the amount of Bi in the interface vicinity improved the sinterability of the garnet-type oxide and increased the contact area between the positive electrode active material and the garnet-type oxide.

From Comparative Examples 1 to 3, it is found that as the amount of Li of the garnet-type oxide decreases, that is, as p increases, the initial utilization rate of the active material is improved. This is considered to be because the amount of Li in the garnet-type oxide is reduced to suppress the side reaction with the positive electrode active material having a layered rock salt structure. On the other hand, also in Comparative Example 3, it was found that the utilization rate during 1C discharge was as low as 21%. This is considered to be because the ionic conductivity of the garnet-type oxide decreases as the amount of Bi increases.

It is considered that although the garnet-type oxide of Comparative Example 1 has high ionic conductivity, the positive electrode active material is modified by co-firing, so that a capacity retention rate during 1C discharge is also lowered.

Comparison of Examples 1 to 5 and 6 with Example 7 shows that when the interface vicinity and the particle interior satisfy the following conditions for the general formula (I), "o" or more can be achieved as a comprehensive determination result:

the $D^{II}$ contains Bi; and
the p1 and the p2 satisfy the following relational expression: $0.5 \leq p1 \leq 2.0$; and $0.3 \leq p2 \leq 1.0$.

Comparison of Examples 1 to 3 with Examples 4 to 7 shows that when the interface vicinity and the particle interior satisfy the following conditions for the general formula (I), "⊙" or more can be achieved as a comprehensive determination result:

the $D^{II}$ contains Bi; and
the p1 and the p2 satisfy the following relational expression: $0.25 \leq p1-p2 \leq 1.8$; $0.7 \leq p1 \leq 2.0$; and $0.3 \leq p2 \leq 0.7$.

The solid-state battery including the solid electrolyte ceramic of the present invention can be used in various fields where battery use or power storage is assumed. Although it is merely an example, the solid-state battery according to an embodiment of the present invention can be used in the field of electronics mounting. The solid-state battery according to an embodiment of the present invention can also be used in the fields of electricity, information, and communication in which mobile devices and the like are used (for example, electric and electronic equipment fields or mobile equipment fields including mobile phones, smartphones, smartwatches, notebook computers, and small electronic machines such as digital cameras, activity meters, arm computers, electronic papers, wearable devices, RFID tags, card-type electronic money, and smartwatches), home and small industrial applications (for example, the fields of electric tools, golf carts, and home, nursing, and industrial robots), large industrial applications (for example, the fields of forklift, elevator, and harbor crane), transportation system fields (for example, the fields of hybrid vehicles, electric vehicles, buses, trains, power-assisted bicycles, electric two-wheeled vehicles, and the like), power system applications (for example, fields such as various types of power generation, road conditioners, smart grids, and household power storage systems), medical applications (medical device fields such as hearing aid buds), pharmaceutical applications (fields such as dosage management systems), IoT fields, space and deep sea applications (for example, fields such as space probes and submersibles), and the like.

DESCRIPTION OF REFERENCE SYMBOLS

1: Positive electrode active material
2: Garnet-type oxide
21: Peripheral edge region of garnet-type oxide particle
22: Internal region of garnet-type oxide particle (particle interior)
23: Interface vicinity with positive electrode active material in garnet-type oxide (shaded region)
R: Interface with positive electrode active material in garnet-type oxide

The invention claimed is:

1. A solid-state battery comprising:
a positive electrode layer;
a negative electrode layer; and
a solid electrolyte layer between the positive electrode layer and the negative electrode layer,
wherein the positive electrode layer contains a positive electrode active material and an oxide having a garnet-type crystal structure, and a first Li concentration in an interface vicinity with the positive electrode active material in the oxide is lower than a second Li concentration in a particle interior of the oxide.

2. The solid-state battery according to claim 1, wherein the interface vicinity and the particle interior have a chemical composition represented by:

$$(Li_{\alpha-p}A_x)(B^1{}_{\beta-y}B^{II}{}_y)(D^I{}_{\gamma-z}D^{II}{}_z)O_\omega$$

wherein, A is one or more elements that can be made into a solid solution in an Li site of the oxide having the garnet-type crystal structure,
$B^I$ is one or more elements selected from the group consisting of elements having tervalent valency among elements belonging to Groups 1 to 3 having eight-coordination with oxygen,
$B^{II}$ is one or more elements selected from the group consisting of elements having valences other than tervalent valency among elements belonging to Groups 1 to 3 having eight-coordination with oxygen,
$D^I$ is one or more elements selected from the group consisting of elements having tetravalent valency among transition elements and elements belonging to Groups 12 to 15 having six-coordination with oxygen,
$D^{II}$ is one or more elements selected from the group consisting of elements having valences other than tetravalent valency among transition elements and elements belonging to Groups 12 to 15 having six-coordination with oxygen,
$\alpha$, $\beta$, $\gamma$, $\omega$, x, y, and z are as follows;
wherein, in the interface vicinity:
$5.0 \leq \alpha \leq 8.0$;
$2.5 \leq \beta \leq 3.5$;
$1.5 \leq \gamma \leq 2.5$;
$11 \leq \omega \leq 13$;
$0 \leq x \leq 1.0$;
$0 \leq y \leq 1.0$;
$0.4 \leq z \leq 2.2$,
wherein, in the particle interior:
$5.0 \leq \alpha \leq 8.0$;
$2.5 \leq \beta \leq 3.5$;
$1.5 \leq \gamma \leq 2.5$;
$11 \leq \omega \leq 13$;
$0 \leq x \leq 1.0$;

$0 \leq y \leq 1.0$; and
$0.1 \leq z \leq 1.0$, and
when $p = ax - (3-b)y + (d-4)z$
wherein a is an average valence of A; b is an average valence of $B^{II}$; and d is an average valence of $D^{II}$, p in the interface vicinity is larger than p in the particle interior.

3. The solid-state battery according to claim 2, wherein $0.4 < p1 \leq 2.0$.
4. The solid-state battery according to claim 2, wherein $0.1 \leq p1 - p2$.
5. The solid-state battery according to claim 2, wherein $0.4 < p1 \leq 2.0$; and $0.1 \leq p2 \leq 1.5$.
6. The solid-state battery according to claim 2, wherein the $D^{II}$ contains Bi.
7. The solid-state battery according to claim 2, wherein the $D^{II}$ contains Bi, $0.5 < p1 \leq 2.0$; and $0.3 \leq p2 \leq 1.0$.
8. The solid-state battery according to claim 2, wherein the $D^{II}$ contains Bi, $0.25 \leq p1 - p2 \leq 1.8$; $0.7 \leq p1 \leq 2.0$; and $0.3 \leq p2 \leq 0.7$.
9. The solid-state battery according to claim 1, wherein the positive electrode active material has a layered rock salt structure.
10. The solid-state battery according to claim 1, wherein the positive electrode layer and the negative electrode layer are layers capable of occluding and releasing lithium ions.
11. The solid-state battery according to claim 1, wherein the solid electrolyte layer, the positive electrode layer, and the negative electrode layer are an integrally sintered body.
12. A solid-state battery comprising:
a positive electrode layer;
a negative electrode layer; and
a solid electrolyte layer between the positive electrode layer and the negative electrode layer,
wherein the positive electrode layer contains a positive electrode active material and an oxide having a garnet-type crystal structure, and an interface vicinity with the positive electrode active material in the oxide and a particle interior of the oxide has a chemical composition represented by:

$$(Li_{\alpha-p}A_x)(B^I{}_{\beta-y}B^{II}{}_y)(D^I{}_{\gamma-z}D^{II}{}_z)O_\omega$$

wherein, A is one or more elements that can be made into a solid solution in an Li site of the oxide having the garnet-type crystal structure,
$B^I$ is one or more elements selected from the group consisting of elements having tervalent valency among elements belonging to Groups 1 to 3 having eight-coordination with oxygen,
$B^{II}$ is one or more elements selected from the group consisting of elements having valences other than tervalent valency among elements belonging to Groups 1 to 3 having eight-coordination with oxygen,
$D^I$ is one or more elements selected from the group consisting of elements having tetravalent valency among transition elements and typical elements belonging to Groups 12 to 15 having six-coordination with oxygen,
$D^{II}$ is one or more elements selected from the group consisting of elements having valences other than tetravalent valency among transition elements and typical elements belonging to Groups 12 to 15 having six-coordination with oxygen,
$\alpha$, $\beta$, $\gamma$, $\omega$, x, y, and z are as follows;
wherein, in the interface vicinity:
$5.0 \leq \alpha \leq 8.0$;
$2.5 \leq \beta \leq 3.5$;
$1.5 \leq \gamma \leq 2.5$;
$11 \leq \omega \leq 13$;
$0 \leq x \leq 1.0$;

$0 \leq y \leq 1.0$;

$0.4 \leq z \leq 2.2$:

wherein, in the particle interior:

$5.0 \leq \alpha \leq 8.0$;

$2.5 \leq \beta \leq 3.5$;

$1.5 \leq \gamma \leq 2.5$;

$11 \leq \omega \leq 13$;

$0 \leq x \leq 1.0$;

$0 \leq y \leq 1.0$; and $0.1 \leq z \leq 1.0$, and when $p=ax-(3-b)y+(d-4)z$ wherein a is an average valence of A; b is an average valence of $B''$; and d is an average valence of $D''$, p in the interface vicinity is p1, p in the particle interior is p2, and p1 is larger than p2.

13. The solid-state battery according to claim 12, wherein $0.4 < p1 \leq 2.0$.

14. The solid-state battery according to claim 12, wherein $0.1 \leq p1-p2$.

15. The solid-state battery according to claim 12, wherein $0.4 < p1 \leq 2.0$; and $0.1 \leq p2 \leq 1.5$.

16. The solid-state battery according to claim 12, wherein the $D''$ contains Bi.

17. The solid-state battery according to claim 12, wherein the $D''$ contains Bi, $0.5 < p1 \leq 2.0$; and $0.3 \leq p2 \leq 1.0$.

18. The solid-state battery according to claim 12, wherein the $D''$ contains Bi, $0.25 \leq p1-p2 \leq 1.8$; $0.7 \leq p1 \leq 2.0$; and $0.3 \leq p2 \leq 0.7$.

19. The solid-state battery according to claim 12, wherein the positive electrode active material has a layered rock salt structure.

20. The solid-state battery according to claim 12, wherein the positive electrode layer and the negative electrode layer are layers capable of occluding and releasing lithium ions.

\* \* \* \* \*